United States Patent [19]
Collins et al.

[11] 3,869,595
[45] Mar. 4, 1975

[54] INSULATED HEATED LUNCH BOX

[76] Inventors: Walter Collins, 9543 Achates Cir., Sacramento, Calif. 95826; Howard Blankumsee, 232 Olmstead Dr., Sacramento, Calif. 95838

[22] Filed: June 19, 1974

[21] Appl. No.: 480,940

[52] U.S. Cl. ............... 219/387, 99/413, 99/415, 99/416, 219/326, 219/432, 219/435, 219/439, 219/442, 219/521
[51] Int. Cl. ............... A21b 1/52, F27d 11/02
[58] Field of Search .......... 219/326, 385, 386, 387, 219/430, 432, 433, 435, 438, 439, 440, 441, 442, 521; 99/410, 413, 415, 416, 417, 418

[56] References Cited
UNITED STATES PATENTS

| | | | |
|---|---|---|---|
| 1,377,092 | 5/1921 | Phaneuf | 219/387 |
| 2,543,524 | 2/1951 | DeOliveira | 219/387 |
| 2,545,127 | 3/1951 | Wnuk | 219/387 |
| 2,611,851 | 9/1952 | Lott | 219/387 |
| 3,219,798 | 11/1965 | Farrell | 219/387 |
| 3,347,618 | 10/1967 | McKeown | 219/439 X |
| 3,385,952 | 5/1968 | Mix | 219/387 |
| 3,482,078 | 12/1969 | Milne | 219/387 |
| 3,609,297 | 9/1971 | Christopoulos | 219/439 |
| 3,746,837 | 7/1973 | Frey et al. | 219/387 |
| 3,805,018 | 4/1974 | Luong et al. | 219/387 |

FOREIGN PATENTS OR APPLICATIONS
820,555  9/1959  Great Britain ............... 219/439

*Primary Examiner*—Volodymyr Y. Mayewsky
*Attorney, Agent, or Firm*—Blair & Brown

[57] ABSTRACT

An insulated lunch box is provided with a controllable electric heater and a water bath which is heated by the electric heater for providing heat in the lunch box and for cooking or heating items such as eggs and hot dogs. The lunch box is built with upper and lower portion with a food tray arranged on the lower portion above the water so that food therein can be heated thereby.

6 Claims, 5 Drawing Figures

PATENTED MAR 4 1975
3,869,595
SHEET 2 of 2
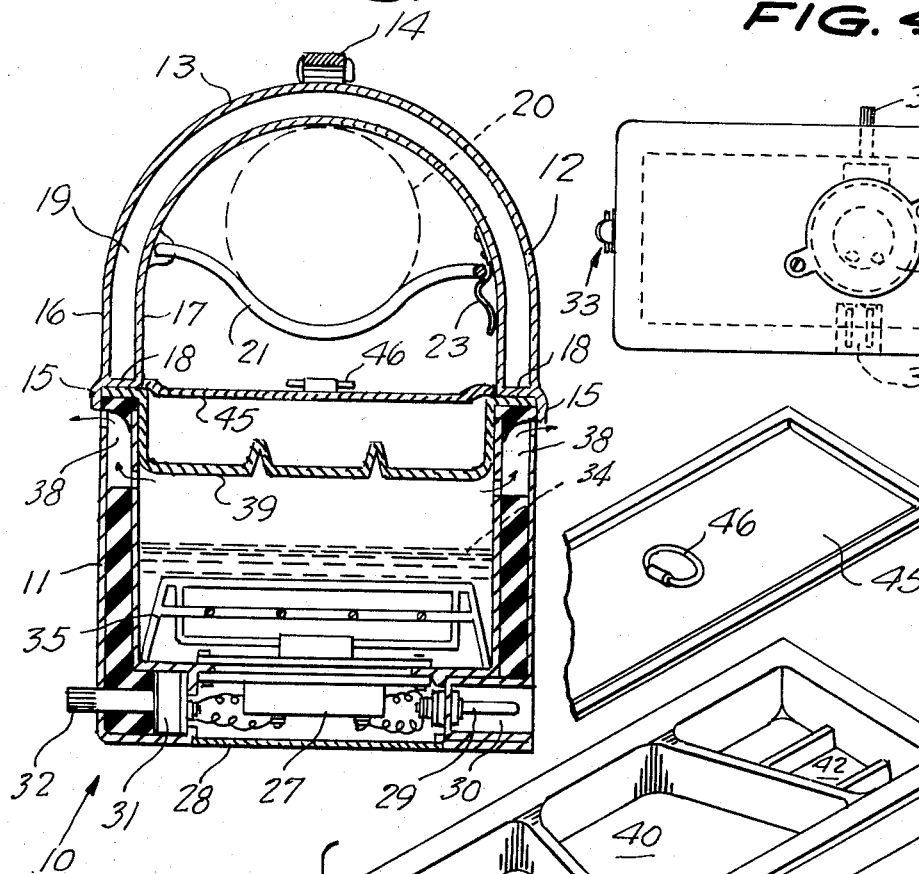
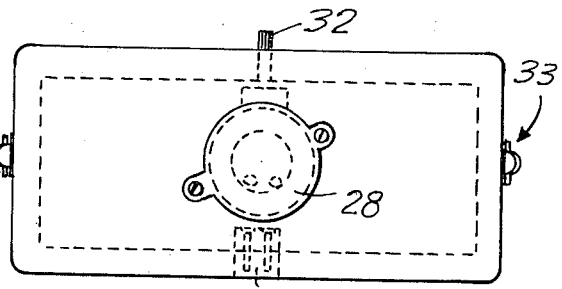
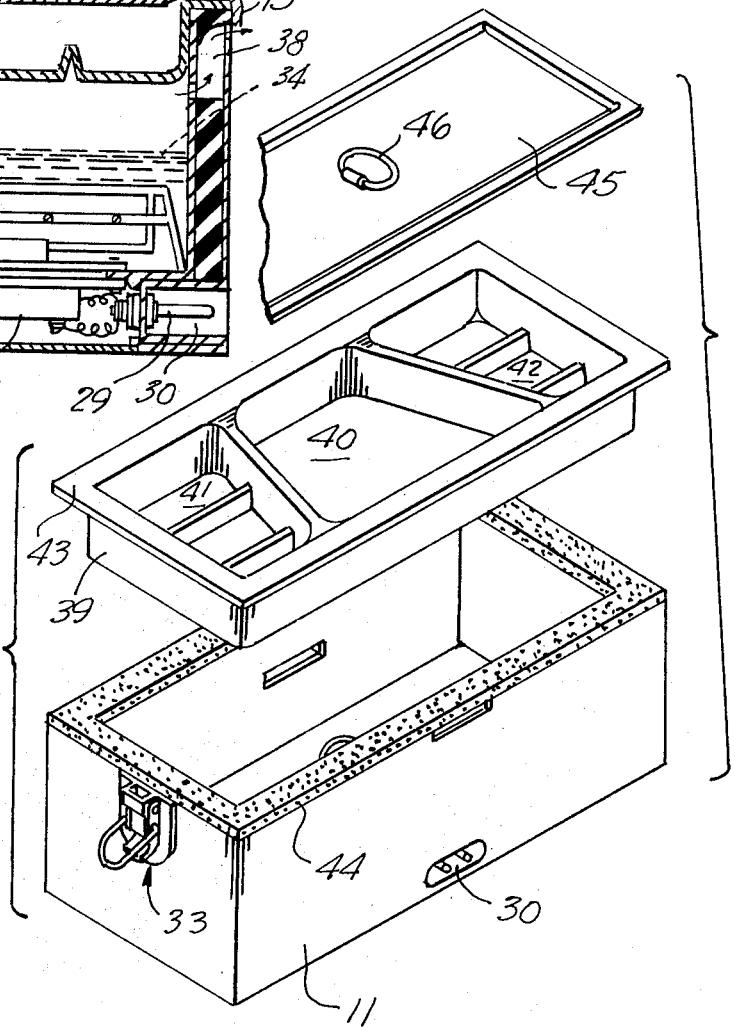

INSULATED HEATED LUNCH BOX

BACKGROUND OF THE INVENTION

1. Field of the Invention

The present invention relates to insulated electrically heated lunch boxes.

2. Summary of the Invention

The insulated electrically heated lunch box of the present invention includes a lower portion and an upper portion detachably secured to the lower portion with each of the portions having insulated walls. An electric heater in the lower portion is controllable to provide the degree of heat desired. Water is heated in the lower portion by the electric heater to provide heat for the lunch box and for cooking eggs and hot dogs or the like when desired. A wire rack in the lower portion is adapted to support covered food containers as desired. A food tray is supported on the lower portion above the water level and a cover is provided for the food tray to protect the food therein.

A thermos bottle for a luncheon beverage is supported in the upper portion above the food tray.

The primary object of the invention is to provide an insulated heated lunch box which can be used to produce a hot lunch away from home.

Other objects and advantages will become apparent in the following specification when considered in light of the attached drawings.

BRIEF DESCRIPTION OF THE DRAWINGS

FIG. 3 is a transverse vertical sectional view taken along the line 3—3 of FIG. 2, looking in the direction of the arrows;

FIG. 4 is a bottom plan view of the invention; and

FIG. 5 is an exploded perspective view of the lower portion of the lunch box, the food tray, and the removeable cover for the food tray.

DESCRIPTION OF THE PREFERRED EMBODIMENT

Figure 1:
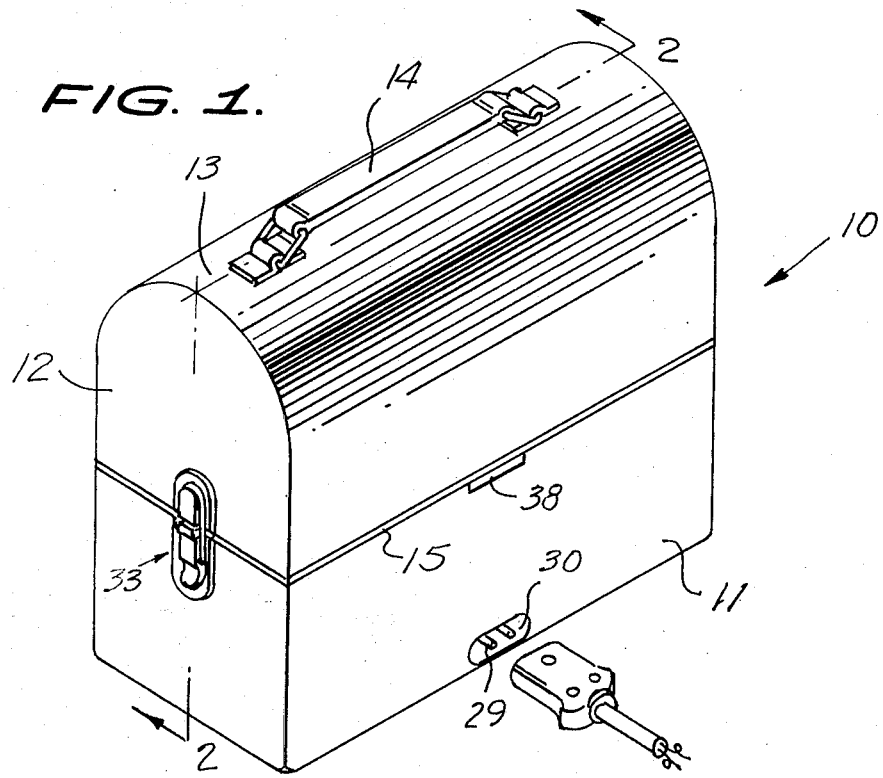
FIG. 1 is a perspective view of the invention.
Figure 2:
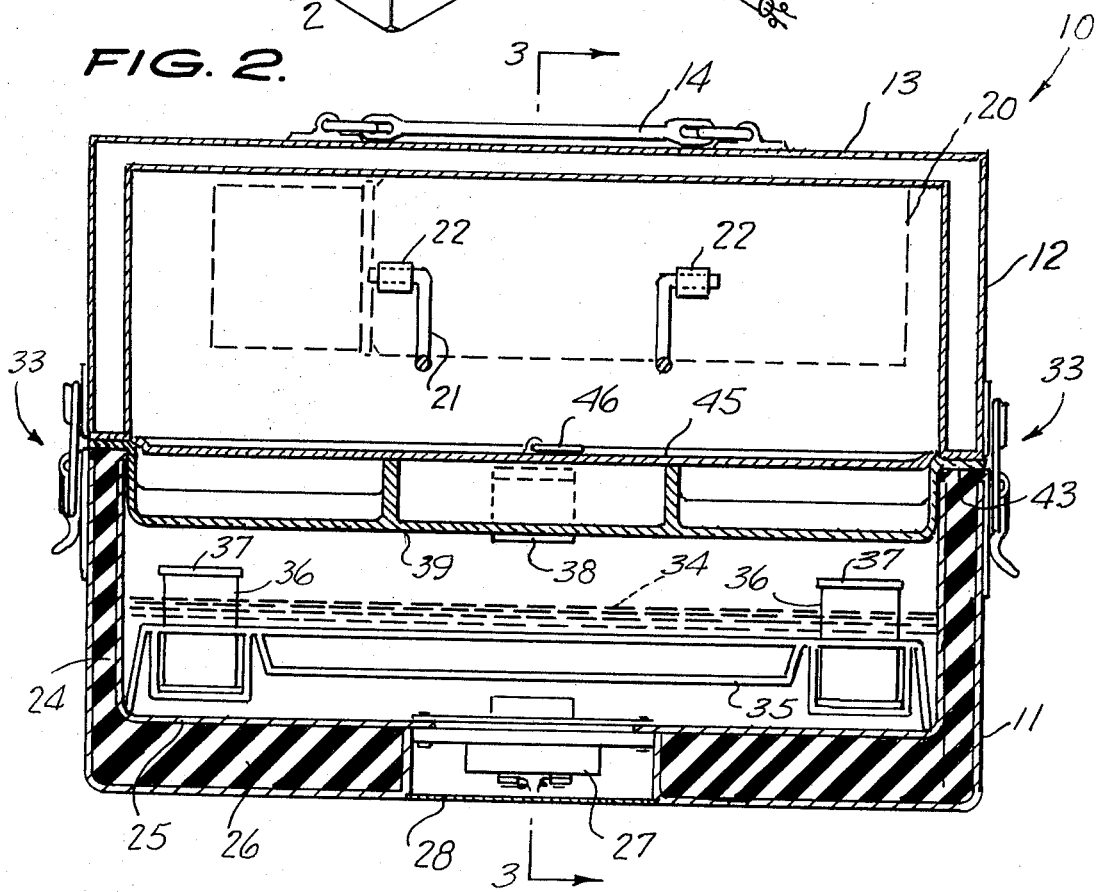
FIG. 2 is an enlarged vertical sectional view taken along the line 2—2 of FIG. 1, looking in the direction of the arrows.

Referring now to the drawings in detail, wherein like reference characters indicate like parts throughout the several figures, the reference numeral 10 indicates generally an insulated heated lunch box constructed in accordance with the invention.

The lunch box 10 includes a generally rectangular lower portion 11, an upper portion 12 having a semicylindrical top wall 13 and a strap handle 14. The top portion 12 has an external flange 15 which engages over the upper edge of the bottom portion 11 to provide a tight seal.

The upper portion 12 has an outer wall 16 and an inner wall 17 spaced apart therefrom and connected thereto by a generally horizontal wall 18. The walls 16, 17 have insulating space 19 therebetween and this space may be filled with any desired insulating material. A thermos bottle 20 is positioned in the top portion 12 and secured therein by a wire bracket 21 pivotally secured at 22 to the upper portion 12 with its opposite end secured by a spring clip 23.

The bottom portion 11 has an outer wall 24 and an inner wall 25 spaced therefrom. Insulating material 26 fills the space between the walls 24, 25 to insulate the lower portion 11.

An electric heater 27 is secured to the lower portion 11 centerly thereof and is protected by a cover plate 28 secured to the lower portion 11. Electric contact elements 29 extend from the electric heater 27 and are positioned in a socket 30 on one side of the lower unit 11. A rheostat control 31 is positioned on the opposite side of the lower unit 11 and has a hand operated knob 32 projecting outwardly of the lower unit 11 for operation by the user. The rheostat 31 is connected in series to the heating element 27 so as to control the amount of heat delivered thereby.

Buckles generally indicated at 33 secure the upper portion 12 to the lower portion 11.

The lower portion 11 encloses a water bath 34 which can be used for cooking hot dogs and eggs as well as for maintaining heat within the lunch box 10.

A wire rack 35 is supported within the lower unit 11 and is adapted to hold food containers 36 having covers 37. The lower unit 11 is provided with air vents 38 on opposite sides thereof to permit the escape of water vapors and heated air as needed.

A generally rectangular food tray 39 is provided with a central area 40 for the meat dish and end areas 41, 42 for vegetables. The food tray 39 has a generally horizontal flange 43 encompassing its upper edge and adapted to rest on the upper edge of the lower unit 11. When desired the insulation 26 may extend beyond the top of the lower unit 11 to form a gasket 44 on which the flange 43 rests. A generally rectangular cover 45 is provided with a ring handle 46 with the cover 45 closing the food tray 39 to prevent contamination of the food therein.

In the use and operation of the invention the lunch box is filled with the desired food at home and carried to the job where it is plugged into the electric circuit so as to energize the heating element 27 and heat the water 34. This will heat the food on the tray 39 and food in the containers 36. Water vapors and heated air will escape through the vents 38. In the event that any food items normally cooked in boiling water are desired they are merely placed in the water bath 34 and the hand control 31 is set to produce the desired temperature of the water.

Having thus described the preferred embodiment of the invention it should be understood that numerous structural modifications and adaptations may be resorted to without departing from the spirit of the invention.

What is claimed is:

1. An insulated heated lunch box comprising a lower compartment unit having spaced dual walls and insulation positioned between said dual walls, an upper compartment unit including spaced dual walls and insulating material between said upper unit spaced dual walls, a peripheral flange on said upper unit engaging over said lower unit, means for detachably securing said upper unit to said lower portion an electric heater in said lower unit for heating water contained in said lower unit, electrical control means for controlling the amount of heat dissipated from said electric heater, rack means in said lower unit immersed in the water therein for supporting a plurality of food containers therein, a food tray, means on said food tray for supporting said food tray on said lower unit above the water level therein, and a cover for said food tray.

2. A device as claimed in claim 1 including a thermos bottle detachably secured in said upper unit.

3. A device as claimed in claim 1 wherein means are provided on said food tray for sealing engagement with said lower unit.

4. A device as claimed in claim 1 wherein the means controlling said electric unit includes a rheostat and hand adjustable means for controlling said rheostat.

5. A device as claimed in claim 1 wherein said means rack is supported on the inner wall of said lower unit and includes means for positively engaging said food containers.

6. A device as claimed in claim 1 including steam and hot air vents extending through the walls of said lower unit.

* * * * *